(12) United States Patent
Kitamura et al.

(10) Patent No.: US 6,238,785 B1
(45) Date of Patent: *May 29, 2001

(54) THERMOPLASTIC RESIN FILM WITH EXCELLENT PRINTABILITY

(75) Inventors: Kazuhisa Kitamura; Koichi Asami, both of Ibaraki (JP)

(73) Assignee: Oji-Yuka Synthetic Paper Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,717

(22) Filed: Oct. 3, 1997

(30) Foreign Application Priority Data

Oct. 4, 1996 (JP) .................................................. 8-264674
Aug. 7, 1997 (JP) .................................................. 9-224429

(51) Int. Cl.$^7$ ...................................................... B32B 27/00
(52) U.S. Cl. ........................ 428/323; 428/327; 428/341; 428/411.1; 428/473.5; 428/474.4; 428/500; 428/908
(58) Field of Search ................................. 428/64.2, 323, 428/327, 341, 411.1, 473.5, 474.4, 500, 908

(56) References Cited

U.S. PATENT DOCUMENTS

| | | | |
|---|---|---|---|
| 4,663,216 | * 5/1987 | Toyoda et al. ........................ | 428/212 |
| 4,740,420 | * 4/1988 | Akutsu et al. ........................ | 428/341 |
| 4,906,526 | * 3/1990 | Inoue et al. ........................ | 428/473.5 |
| 5,310,591 | * 5/1994 | Dodge et al. ........................ | 428/195 |
| 5,397,637 | * 3/1995 | Asami et al. ........................ | 428/323 |
| 5,700,852 | * 12/1997 | Iwanaga et al. ..................... | 523/201 |
| 5,711,839 | * 1/1998 | Dronzek, Jr. ........................ | 156/277 |
| 5,834,098 | * 11/1998 | Kitamura et al. .................... | 428/195 |
| 5,871,833 | * 2/1999 | Henbo et al. ........................ | 428/138 |

FOREIGN PATENT DOCUMENTS

| | | |
|---|---|---|
| 0 282 955 | 9/1988 | (EP) . |
| 0 434 280 | 6/1991 | (EP) . |
| 0 580 030 | 1/1994 | (EP) . |
| 989377 | 4/1965 | (GB) . |
| 1010649 | 11/1965 | (GB) . |
| 1079402 | 8/1967 | (GB) . |
| 2099002 | * 12/1982 | (GB) . |
| 2 099 002 | 12/1982 | (GB) . |
| 49-074767 | * 7/1974 | (JP) . |
| 61-132376 | * 6/1986 | (JP) . |
| 4041567 | * 2/1992 | (JP) . |

* cited by examiner

*Primary Examiner*—Stevan A. Resan
(74) *Attorney, Agent, or Firm*—Oblon, Spivak, McClelland, Maier & Neustadt, P.C.

(57) ABSTRACT

This invention relates to a thermoplastic resin film permitting excellent paper feed and discharge and excellent transfer of offset printing ink and ink adhesion even under high humidity conditions in the summertime.

57 Claims, No Drawings

THERMOPLASTIC RESIN FILM WITH EXCELLENT PRINTABILITY

BACKGROUND OF THE INVENTION

1. Field of the Invention

This invention relates to a thermoplastic resin film permitting excellent paper feed and discharge and excellent transfer of offset printing ink and ink adhesion even under high humidity conditions in the summertime.

2. Description of the Related Arts

An opaque or semitransparent film comprising a single polyolefin film layer containing a fine inorganic powder or a laminate having such a fine inorganic powder-containing polyolefin film layer on at least one side thereof, especially a microporous stretched film, is useful as synthetic paper [JP-B-46-407994 (the term "JP-B" as used herein means an "examined published Japanese patent publication"), U.S. Pat. No. 3,765,999).

Synthetic paper comprising the above-mentioned fine inorganic powder-containing or organic filler-containing thermoplastic resin film has experienced a steadily increasing use over a very broad field, for example, a poster paper, atlas paper, bar code paper, prepaid card base paper, in-mold labels, playing card paper or a support for a heat transfer recording paper, because of its excellent physical properties such as water resistance, toughness and surface smoothness. With its increasing utility, synthetic paper of this type having improved antistatic properties and printability in offset printing or printing with ultraviolet-curing inks is in greater demand than ever.

Because polyolefins per se are non polar and hydrophobic, synthetic paper, particularly, polyolefin synthetic paper does not always-have satisfactory antistatic properties or offset printability, and it is usually subjected to an appropriate surface treatment such as corona discharge treatment, plasma treatment or ozone treatment, to improve these properties.

Among such surface treatments, it is the common practice to apply primer coating with polyethyleneimine or the like subsequent to the corona discharge treatment (U.S. Pat. No. 4,906,526, U.S. Pat. No. 4,420,536, JP-B-43-6676). The above method is however accompanied by the drawbacks that uniform primer coating cannot be obtained, presumably because the corona discharge treatment is inferior in the capacity to make the surface hydrophilic, and adhesion of an offset ink to a film is inferior, presumably because molecular cleavage of the polyolefin resin occurs owing to corona discharge and low-molecular weight oxides are formed.

SUMMARY OF THE INVENTION

In a first aspect of the present invention, there is provided a thermoplastic resin film having a surface subjected to a flame treatment at an energy of 8,000 to 200,000 joule/m², which is provided thereon with a coated layer comprising at least one surfactant selected from the group consisting of anionic surfactants, nonionic surfactants, cationic surfactants and amphoteric surfactants.

In a second aspect of the present invention, there is provided a thermoplastic resin film having a surface subjected to a flame treatment at an energy of 8,000 to 200,000 joule/m² which is provided thereon with a coated layer comprising a water-soluble quaternary ammonium salt copolymer (I) containing a structural unit (a) represented by the following formula (1):

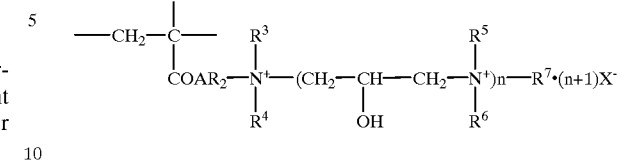

(1)

wherein A represents —O— or —NH—, $R^1$ represents a hydrogen atom or a methyl group, $R^2$ represents a $C_{2-4}$ alkylene group or —CH$_2$—CH(OH)—CH$_2$—, $R^3$, $R^4$, $R^5$ and $R^6$ are the same or different and each independently represents a $C_{1-3}$ alkyl group, $R^7$ represents a $C_{1-10}$ alkyl group or a $C_{7-10}$ aralkyl group, n stands for an integer of 1 to 3, and X represents a chlorine, bromine or iodine atom; a structural unit (b) represented by the following formula (2):

(2)

wherein $R^8$ represents a hydrogen atom or a methyl group, $R^9$ represents a $C_{1-22}$ alkyl group, $C_{7-22}$ aralkyl group or $C_{5-22}$ cycloalkyl group; and a structural unit (c) derived from a monomer copolymerizable with the components (a) and (b), the copolymerization weight ratio of said components (a), (b) and (C) falling within a range of 30 to 70:30 to 70:0 to 40.

In a third aspect of the present invention, there is provided a thermoplastic resin film which is further provided thereon with a coated layer further comprising, based on 100 parts by weight of the water-soluble quaternary ammonium salt copolymer (I), 10 to 600 parts by weight of a polyethyleneimine polymer (II) selected from the group consisting of polyethyleneimine, poly(ethyleneimine-urea), polyaminepolyamide-polyethyleneimine adduct and alkylated (preferably, $C_{1-8}$ alkyl groups) polyethyleneimine, 5 to 500 parts by weight of a polyaminepolyamide-epichlorohydrin adduct (III), and 5 to 200 parts by weight of an alkali metal salt or alkaline earth metal salt (IV).

In a fourth aspect of the present invention, there is provided a thermoplastic resin film having a surface subjected to a flame treatment at an energy of 8,000 to 200,000 joule/m² which is provided thereon with a coated layer comprising a betaine type amphoteric copolymer (V) containing a structural unit (d) represented by the following formula (3):

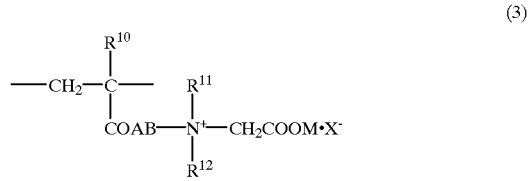

(3)

wherein A represents —O— or —NH—, B represents a $C_{2-6}$ alkylene group, $R^{10}$ represents a hydrogen atom or a methyl group, $R^{11}$ and $R^{12}$ each represents a $C_{1-4}$ alkyl group, X represents a chlorine, bromine or iodine atom, and M represents an alkali metal ion (particularly, sodium, potassium or lithium); a structural unit (4) represented by the following formula (e):

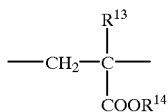
(4)

wherein $R^{13}$ represents a hydrogen atom or a methyl group, $R^{14}$ represents a $C_{1-22}$ alkyl group, $C_{7-22}$ aralkyl group or $C_{5-22}$ cycloalkyl group; a structural unit (5) represented by the following formula (f):

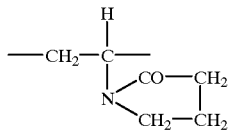
(5)

and a structural unit (g) derived from a monomer copolymerizable with the component (d), (e) and (f), the copolymerizable weight ratio of said components (d), (e), (f) and (g) falling within a range of 25 to 45:30 to 70:0 to 25:0 to 25.

In a fifth aspect of the present invention, there is provided a thermoplastic resin film which is further provided thereon with a coated layer further comprising, based on 100 parts by weight of the betaine type amphoteric copolymer (V) copolymer (I), 10 to 600 parts by weight of a polyethyleneimine polymer (II) selected from the group consisting of polyethyleneimine, poly(ethyleneimine-urea), polyaminepolyamide-polyethyleneimine adduct and alkylated (preferably, $C_{1-8}$ alkyl groups) polyethyleneimine, 5 to 500 parts by weight of a polyaminepolyamide-epichlorohydrin adduct (III), and 5 to 200 parts by weight of an alkali metal salt or alkaline earth metal salt (IV).

According to the flame treatment, the adhesion of the surfactant to the film can be improved, and in addition, the coated surfactant layer makes it possible to improve the paper feed and discharge and also the transfer of the offset printing ink and ink adhesion even under high temperature and high humidity conditions in the summertime.

As described above, the synthetic paper according to the present invention permits excellent paper feed and discharge and also the transfer of the offset printing ink and ink adhesion under the high humidity conditions in the summertime so that broad demand in the practical use can be satisfied.

DETAILED DESCRIPTION OF THE PREFERRED EMBODIMENTS

The thermoplastic resin film of the present invention having excellent printability comprises a base layer comprised of a thermoplastic resin film, particularly a thermoplastic resin film layer having a surface of polyolefin synthetic paper subjected to flame treatment; and a coated layer formed by applying thereto at least one coating agent comprising a surfactant selected from anionic surfactants, cationic surfactants, amphoteric surfactants and nonionic surfactants, followed by drying.

Thermoplastic Resin Film Layer

Non-limiting examples of the thermoplastic resin film as a base layer usable in the present invention include films of thermoplastic resins such as polyolefins, e.g., polypropylene, polyethylene, and propylene-ethylene copolymer, polyethylene terephthalate, polybutylene terephthalate, polystyrene and nylon-6; and films each having on its surface a film layer formed of the above exemplified thermoplastic resin and a fine inorganic powder or an organic filler.

Such thermoplastic resin films, especially synthetic paper per se are well known. For details, reference can be made to U.S. Pat. No. 3,765,999, U.S. Pat. No. 4,075,050, JP-A-56-118437 (the term "JP-A" as used herein means an unexamined published Japanese patent application), JP-57-12642 and JP-A-57-56224.

Non-limiting examples of the thermoplastic resin film include a laminated film comprising, as a surface layer (paper layer), a microporous film formed by uniaxially stretching a polyolefin film containing 8 to 65 wt. % of a fine inorganic powder, e.g., calcined clay, diatomaceous earth, titanium oxide, vermiculite, calcium carbonate or talc, having a particle size of from 0.05 to 10 μm, thereby forming fine cracks around the fine inorganic powder on the surface of the film and a number of microvoids (at least 5 voids per $mm^2$) in the inside thereof and, as a core layer, a biaxially-stretched thermoplastic resin film containing 5 to 40 wt. % of a fine inorganic powder, said core layer being laminated on one side or both sides thereof with the surface layer (see U.S. Pat. No. 4,075,050); high-gloss synthetic paper comprising the above-mentioned laminated film having further laminated on the surface thereof a polyolefin film layer containing substantially no fine inorganic powder and having a thickness of from 0.5 to 50 μm (JP-B-5-57110); and synthetic paper with a pearly luster comprising a biaxially stretched thermoplastic resin film containing 10 to 40 wt. % of a fine inorganic powder (U.S. Pat. No. 3,773,608).

Flame Treatment

In the present invention, it is important to subject the surface of such a thermoplastic resin film to flame treatment prior to the application of a coating agent which will be described later.

The flame treatment may be carried out by applying flame directly to the surface of the thermoplastic resin film at an energy of 8,000 to 200,000 joule/$m^2$, preferably 10,000 to 150,000 joule/$m^2$, particularly preferably 20,000 to 100,000 joule/$m^2$.

Described specifically, the surface of the thermoplastic resin film is flame-treated using as a flammable gas, such as a $C_{1-5}$ hydrocarbon (e.g., methane, propane or the like) by a flame treatment apparatus such as "FLYNN F 3000 Direct Flame Plasma treatment apparatus" (trade name; product of FLYNN BURNER) at a line velocity of 1 to 200 m/min, preferably 30 to 100 m/min, even more preferably about 40 m/min, for $1.0 \times 10^{-5}$ to 10 seconds. The distance from the film surface to the flame is preferably 0.5 to 100 mm, more preferably 2 to 50 mm.

By this flame treatment, the surface of the thermoplastic resin film can be made hydrophilic without being deteriorated, by which the thermoplastic resin film becomes excellent in transfer of offset printing ink and ink adhesion, different from the films subjected to the other surface treatment such as ozone treatment or plasma treatment.

Coated Layer (1) Components

The above-described coated layer can be obtained by using surfactants selected from the group consisting of (A) anionic surfactants, (B) nonionic surfactants, (C) cationic surfactants and (D) amphoteric surfactants either singly or in combination. Examples of the binary combination of the surfactants include that of an anionic surfactant and a nonionic surfactant, that of a cationic surfactant and a nonionic surfactant, that of an amphoteric surfactant and a nonionic surfactant, that of a cationic surfactant and an amphoteric surfactant and that of a cationic surfactant and a nonionic surfactant. The combination of an anionic surfactant and a cationic surfactant and that of an anionic surfactant and an amphoteric surfactant are not preferred because such combinations cause cohesion or gelation.

(A) Anionic Surfactant

Non-limiting examples of the anionic surfactant include carboxylate salts, sulfate ester salts, sulfonate salts, phosphate ester salts and dithiophosphate ester salts. Specific example of the preferred anionic surfactant include, for example, compounds represented by the following formulas (6) to (7) as carboxylate salts and those represented by the following formulas (8) to (9) as sulfonate salts.

$$R^{15}COOM \quad (6)$$

wherein $R^{15}$ represents a $C_{4-30}$ alkyl or $C_{4-30}$ alkenyl group and M represents an alkali metal ion, particularly, lithium, sodium or potassium.

Specific examples include sodium laurate, sodium stearate and sodium oleate.

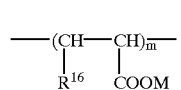
(7)

wherein $R^{16}$ represents a hydrogen atom, a methyl group, a carboxyl group or a carboxyl-neutralized salt, M represents an alkali metal ion, particularly, lithium, sodium or potassium ion and m stands for an integer of from 4 to 10,000.

Specific examples include sodium maleate copolymer, potassium maleate copolymer, sodium acrylate copolymer and potassium acrylate copolymer. Specific examples of the copolymer component include ethylene, styrene and acrylic acid.

$$R^{17}\text{—}\emptyset\text{—}SO_3M \quad (8)$$

wherein $R^{17}$ represents a $C_{4-30}$ alkyl or $C_{4-30}$ alkenyl group, ø represents an aromatic ring of $C_6H_4$ and M represents an alkali metal ion, particularly lithium, sodium or potassium ion.

Specific examples include sodium dodecylbenzenesulfonate and sodium octylbenzenesulfonate.

$$R^{18}\text{—}SO_3M \quad (9)$$

wherein $R^{18}$ represents a $C_{4-30}$ alkyl or $C4-30$ alkenyl group and M represents an alkali metal ion, particularly lithium, sodium or potassium ion.

Specific examples include sodium stearylsulfonate, sodium octylsulfonate and sodium laurylsulfonate.

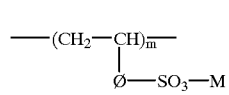
(10)

wherein M represents an alkali metal ion, particularly lithium, sodium or potassium ion, m stands for an integer of from 4 to 10000 and Ø represents an aromatic ring of $C_6H_4$.

Specific examples include sulfonate-containing copolymers.

Alternatively, copolymers of a sulfonic-acid-metal-containing styrene and another vinyl monomer copolymerizable therewith, for example, ethylene, (meth)acrylic acid or alkyl (meth)acrylate can also be used.

(B) Nonionic Surfactant

Non-limiting examples of the nonionic surfactant include polyethylene glycol surfactants and polyhydric alcohol surfactants.

Examples of the polyethylene glycol surfactant include those represented by the following formulas (11) to (19).

(11)

(12)

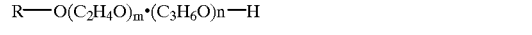
(13)

(14)

(15)

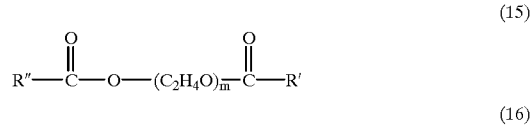
(16)

(17)

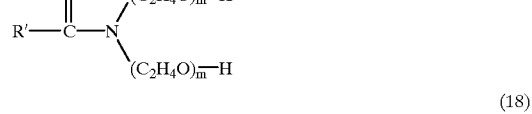
(18)

(19)

wherein R and R' each independently represents a hydrogen atom or a $C_{1-30}$ alkyl group, R" represents a $C_{4-30}$ alkyl group, with octyl, lauryl, cetyl and stearyl being preferred, and m and n each independently represents an integer of from 3 to 100.

Examples of the polyhydric alcohol include those represented by the following formulas (20) to (23).

(20)

Specific examples include glycerol monostearate and glycerol monooleate.

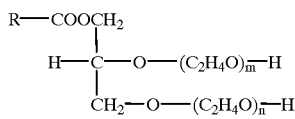
(21)

Specific examples include ethylene-oxide adducts of glycerol monostearate and glycerol monooleate.

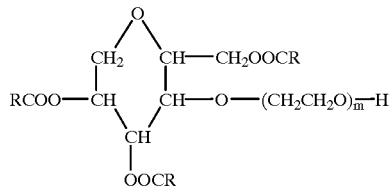
(22)

Specific examples include polyoxyethylene sorbitan trioleate, polyoxyethylene sorbitan trilaurate and polyoxyethylene sorbitan tristearate.

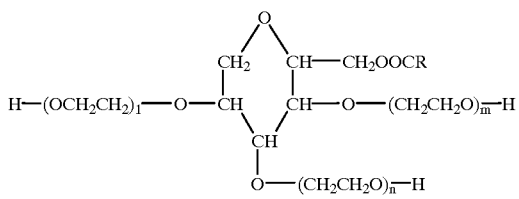
(23)

Specific examples include polyoxyethylene sorbitan monooleate, polyoxyethylene monostearate and polyoxyethylene sorbitan monopalminate.

In the above formulas (20) to (23), R represents a $C_{4-30}$ alkyl or $C_{4-30}$ alkenyl group, and l, m and n each independently represents an integer of from 3 to 100.

(C) Cationic Surfactant

Non-limiting examples of the cationic surfactant include quaternary ammonium salt cationic surfactants and amine salt cationic surfactants, with the former type represented by the following formula (24) being preferred.

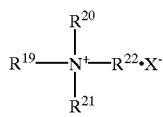
(24)

wherein $R^{19}$ represents a $C_{4-30}$ alkyl or $C_{4-30}$ alkenyl or an amide-bond-containing group, $R^{20}$, $R^{21}$ and $R^{22}$ are the same or different and individually represents a $C_{1-3}$ alkyl, methoxy, ethoxy or benzyl group and $X^-$ represents $Cl^-$, $I^-$, $CH_3SO_4^-$ or $C_{12}H_{25}$—ø—$SO_3^-$ in which ø represents an aromatic ring of $C_6H_4$.

Specific examples include
lauryldimethylbenzylammonium chloride,
lauryltrimethylammonium chloride and Sapamine MS™ and
Sapamine BCH™ (trade names; these two are products of Ciba Geigy).

As a cationic surfactant represented by formula (24), specific examples of the most suited quaternary ammonium salt surfactant include water-soluble quaternary ammonium salt copolymers (I) composed of the below-described structural units (a), (b) and (c), the copolymerization weight ratio of said structural units (a), (b) and (c) falling within a range of 30 to 70:30 to 70:0 to 40.

Structural unit (a):

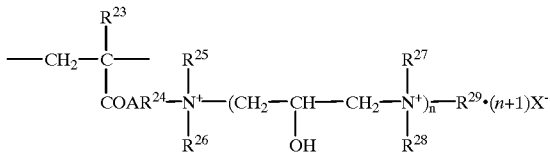
(25)

wherein A represents —O— or —NH—, $R^{23}$ represents a hydrogen atom or a methyl group, $R^{24}$ represents a $C_{2-4}$ alkylene group or —$CH_2$—$CH(OH)$—$CH_2$—, $R^{25}$, $R^{26}$, $R^{27}$ and $R^{28}$ are the same or different and each independently represents a $C_{1-3}$ alkyl group, $R^{29}$ represents a $C_{1-10}$ alkyl group or a $C_{7-10}$ aralkyl group, n stands for an integer of from 1 to 3, and X represents a chlorine, bromine or iodine atom.

A monomer forming the structural unit (a) may be obtained by modifying a tertiary-amine-containing monomer represented by the formula (26) with a modifying agent represented by the following formula (27) prior or subsequent to the polymerization.

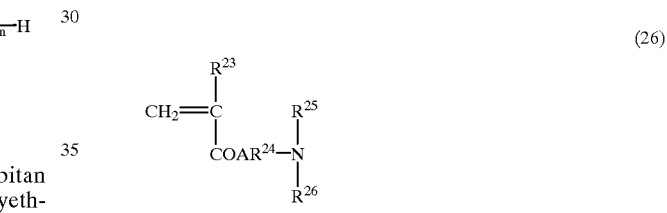
(26)

wherein A, $R^{23}$, $R^{24}$, $R^{25}$ and $R^{26}$ have the same meanings as defined in the above formula (25).

Specific examples include dimethylaminoethyl (meth)acrylate, diethylaminoethyl (meth)acrylate and dimethylaminopropyl (meth)acrylamide.

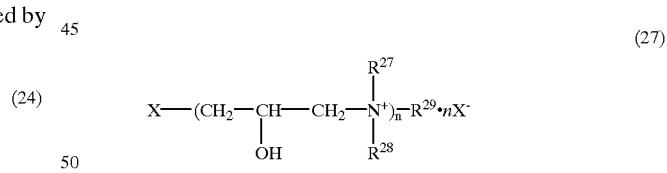
(27)

wherein $R^{27}$, $R^{28}$ and $R^{29}$ have the same meanings as defined in the above formula (25).

Specific examples include 3-chloro-2-hydroxypropyltrimethylammonium chloride.

Structural unit (b):

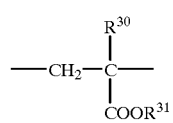
(28)

wherein $R^{30}$ represents a hydrogen atom or a methyl group, $R^{31}$ represents a $C_{1-22}$ alkyl group, $C_{7-22}$ aralkyl group or $C_{5-22}$ cycloalkyl group.

Non-limiting examples of the hydrophobic monomer forming the above formula (28) include alkyl (meth) acrylates such as methyl (meth)acrylate, —ethyl (meth) acrylate, butyl (meth)acrylate, isobutyl (meth)acrylate, tertiary-butyl (meth)acrylate, cyclohexyl (meth)acrylate, 2-ethylhexyl (meth)acrylate, lauryl (meth)acrylate, tridecyl (meth)acrylate and stearyl (meth)acrylate.

Preferred are combinations of methyl methacrylate or ethyl methacrylate and an alkyl methacrylate ($C_{4-22}$ alkyl chain) or cyclohexyl methacrylate.

Structural Unit (c):

Non-limiting examples of the monomer forming the structural unit (c) include hydrophobic monomers such as styrene, vinyl toluene and vinyl acetate and hydrophilic monomers such as vinyl pyrrolidone and (meth)acrylamide.

The polymerization of the above-described water-soluble quaternary ammonium salt copolymer (I) may be conducted in the presence of a radical initiator by conventional methods known in the art such as bulk polymerization, solution polymerization or emulsion polymerization. Of these polymerization methods, preferred is solution polymerization in which monomers are dissolved in a solvent and heated with stirring in a nitrogen gas stream in the presence of a radical polymerization initiator. Preferred examples of the solvent include water and alcohols such as methyl alcohol, ethyl alcohol and isopropyl alcohol, and mixtures thereof. Preferred examples of the polymerization initiator include peroxides such as benzoyl peroxide and lauroyl peroxide-and azo compounds such as azobisisobutyronitrile and azobisvaleronitrile. The total monomer concentration in the solution is usually from 10 to 60 wt. % and the concentration of the polymerization-initiator is usually 0.1 to 10 wt. % based on the total monomers.

The quaternary ammonium salt copolymer may have any desired level of molecular weight by controlling the polymerization temperature, the kind and amount of the polymerization initiator, the amount of the solvent and chain transfer agent, and the like. The polymer obtained has generally a molecular weight (Mn) of 1,000 to 1,000,000, with a range of from 1,000 to 500,000 being preferred.

In addition to the above-described quaternary ammonium salt type copolymer (I), the components (II), (III) and/or (IV), which will be described below, may be added to form the above-described coated layer, in order to improve the transfer and adhesion of the offset printing ink in the summertime.

<Polyethyleneimine polymer (II)>

As a component contributing to the adhesion of ink, particularly adhesion of ultraviolet-curing ink, a polyethyleneimine polymer (II) is added.

Non-limiting examples of such a polyethyleneimine polymer include polyethyleneimine, poly(ethyleneimine-urea), polyaminepolyamide-polyethyleneimine adduct and alkylated (preferably, $C_{1-8}$ alkyl groups) polyethyleneimine (see JP-A-1-141736).

From the standpoint of improvement in adhesion and transfer of offset ink, preferred are polyethyleneimine and a modified polyethyleneimine obtained by modifying a polyaminepolyamide-polyethyleneimine adduct with a $C_{1-24}$ alkyl halide, $C_{2-24}$ alkenyl halide, $C_{3-24}$ cycloalkyl halide or benzyl halide.

The degree of polymerization of the polyethyleneimine to be used is not limited, but preferably ranges from 20 to 3,000.

<Polyaminepolyamide-epichlorohydrin adduct (III)>

As the polyaminepolyamide-epichlorohydrin adduct which is an optional component (III), is a water-soluble cationic thermosetting resin obtained by reacting a polyamide prepared from a saturated dibasic $C_{3-10}$ carboxylic acid and a polyalkylenepolyamine with epichlorohydrin.

For the details of the thermosetting resin, reference is made to JP-B-35-3547.

Non-limiting examples of the saturated dibasic $C_{3-10}$ carboxylic acid include $C_{4-8}$ dicarboxylic acids, particularly adipic acid, while those of the polyalkylenepolyamine include polethylenepolyamine, particularly, ethylenediamine, diethylenetriamine and triethylenetetramine, with diethylenetriamine being most preferred.

In the polyamide forming reaction, the molar ratio of the polyalkylenepolyamine to the dibasic acid is generally 0.9:1 to 1.2. In the reaction-between the polyaminepolyamide and epichlorohydrin, it is common practice to use epichlorohydrin in an amount of about 0.5 to 1.8 moles relative to each secondary amine group in the polyamride.

The adduct so obtained contributes to the improvement in the water-resistant adhesion of ink.

<Alkali metal salt or alkaline earth metal salt (IV)>

Non-limiting examples of the water-soluble inorganic salt, which is an optional component (IV), comprised of an alkali metal salt or alkaline earth metal salt include alkali metal salts such as alkaline salts, for example, sodium carbonate, sodium bicarbonate, potassium carbonate and sodium sulfite and neutral salts such as sodium chloride, sodium sulfate, sodium nitrate, sodium tripolyphosphate and sodium pyrophosphate; and alkaline earth metal salts such as beryllium chloride, magnesium chloride, calcium chloride, strontium chloride and barium nitrate.

When the coated layer contains an inorganic salt, the surface resistivity is lowered and drying velocity of the offset ink increases. Excessive use of the water-soluble inorganic salt is however not preferred because it causes lowering in the water-resistant adhesion of the ink.

<Component ratio of the components (I), (II), (III) and (IV)>The components (II), (III) and/or (IV) may be used in the below-described amounts based on 100 parts by weight of the component (I).

Component (I): 100 parts by weight.

Component (II): 10 to 600 parts by weight, preferably 50 to 300 parts by weight

Component (III): 0 to 500 parts by weight, preferably 5 to 500 parts by weight, particularly 10 to 200 parts by weight.

Component (IV): 0 to 200 parts by weight, preferably 5 to 200 parts by weight, particularly 5 to 70 parts by weight.

When the amount of the component (II) is smaller than 10 parts by weight based on 100 parts by weight of a surfactant as the component (I), ink becomes inferior in adhesion. Amounts exceeding 600 parts by weight, on the other hand, are economically disadvantageous because the improvement in the adhesion of the ink cannot be expected.

(D) Amphoteric Surfactant

Non-limiting examples of the amphoteric surfactant include sulfate ester amphoteric surfactants, sulfonate salt type amphoteric surfactants and phosphate ester type amphoteric surfactants. Carboxylate salt type amphoteric surfactants are suited.

As the carboxylate salt type amphoteric surfactant, betaine type amphoteric surfactants represented by the following formula (29) are preferred.

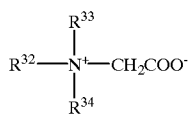
(29)

wherein $R^{32}$ represents a $C_{4\text{-}30}$ alkyl or $C_{4\text{-}30}$ alkenyl group, and $R^{33}$ and $R^{34}$ are the same or different and individually represents a $C_{1\text{-}3}$ alkyl, methoxy or ethoxy group.

Specific include stearyldimethyl betaine, lauryldihydroxy betaine and lauryldimethyl betaine. Most Preferable Betaine Type Amphoteric Surfactant As an amphoteric surfactant, specific examples of the most suited betaine type amphoteric surfactant include betaine type amphoteric copolymer (V) comprised of the below-described structural units (d), (e), (f) and (g), the copolymerization weight ratio of said structural units (d), (e), (f) and (g) falling within a range of 25 to 45:30 to 70:0 to 25:0 to 25.

Structural Unit (d):

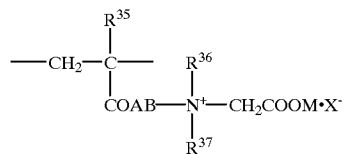
(30)

wherein A represents —O— or —NH—, B represents a $C_{2\text{-}6}$ alkylene group, $R^{35}$ represents a hydrogen atom or a methyl group, $R^{36}$ and $R^{37}$ each represents a $C_{1\text{-}4}$ alkyl group, X represents a chlorine, bromine or iodine atom, and M represents an alkali metal ion (particularly sodium, potassium or lithium).

A monomer forming the-structural unit (d) may be obtained by modifying a tertiary-amine-containing monomer represented by the formula (31) with a modifying agent (e.g., monochloroacetate, monochloroacetate alkylester) prior or subsequent to the polymerization.

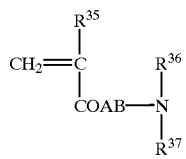
(31)

wherein A, B, $R^{35}$, $R^{36}$ and $R^{37}$ have the same meanings as defined in the above formula (30).

Specific examples include dimethylaminoethyl (meth)acrylate, diethylaminoethyl (meth)acrylate and dimethylaminopropyl (meth)acrylamide.

Structural Unit (e):

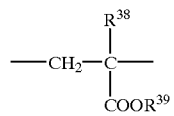
(32)

wherein $R^{38}$ represents a hydrogen atom or a methyl group, $R^{39}$ represents a $C_{1\text{-}22}$ alkyl group, $C_{7\text{-}22}$ aralkyl group or $C_{5\text{-}22}$ cycloalkyl group.

Non-limiting examples of the hydrophobic monomer forming the above formula (32) include alkyl (meth)acrylates such as methyl (meth)acrylate, ethyl (meth)acrylate, butyl (meth)acrylate, isobutyl (meth)acrylate, tertiary-butyl (meth)acrylate, cyclohexyl (meth)acrylate, 2-ethylhexyl (meth)acrylate, lauryl (meth)acrylate, tridecyl (meth)acrylate and stearyl (meth)acrylate.

Preferred are combinations of methyl methacrylate or ethyl methacrylate and an alkyl methacrylate ($C_{4\text{-}22}$ alkyl chain) or cyclohexyl methacrylate.

Structural Unit (f):

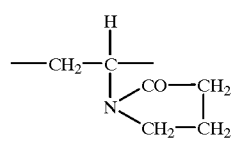
(33)

Structural Unit (g):

Non-limiting examples of the monomer forming the structural unit (g) include vinyl acetate, maleate, vinyl ethers (e.g., vinyl butyl ether, vinyl phenyl ether), acrolein, ally ethyl ether, acryl chloride, butadiene).

The polymerization of the above-described betaine type amphoteric copolymer (V) may be conducted in the presence of a radical initiator by conventional methods known in the art such as bulk polymerization, solution polymerization or emulsion polymerization. Of these polymerization methods, preferred is solution polymerization.

The betaine type amphoteric copolymer (V) obtained has generally a molecular weight (Mn) of 1,000 to 1,000,000, with a range of from 1,000 to 500,000 being preferred.

In addition to the above-described betaine type amphoteric copolymer (V), the components polyethyleneimine polymer (II), polyaminepolyamide-epochlorohydrin adduct (III) and/or alkali metal salt or alkaline earth metal salt (IV), which are described above, may be added to form the above-described coated layer, in order to improve the transfer and adhesion of the offset printing ink in the summertime.

<Component ratio of the components (V), (II), (III) and (IV)>

The components (II), (III) and/or (IV) may be used in the below-described amounts based on 100 parts by weight of the component (V).

Component (V): 100 parts by weight.

Component (II): 10 to 600 parts by weight, preferably 50 to 300 parts by weight

Component (III): 0 to 500 parts by weight, preferably 5 to 500 parts by weight, particularly 10 to 200 parts by weight.

Component (IV): 0 to 200 parts by weight, preferably 5 to 200 parts by weight, particularly 5 to 70 parts by weight.

When the amount of the component (II) is smaller than 10 parts by weight based on 100 parts by weight of a surfactant as the component (V), ink becomes inferior in adhesion. Amounts exceeding 600 parts by weight, on the other hand, are economically disadvantageous because the improvement in the adhesion of the ink cannot be expected.

(E) Other Optional Components (E)

In addition to the above-described components, the coated layer may also contain a water soluble or water dispersible polymer, finely-divided substance and/or other auxiliary agents.

(2) Formation of a Coated Layer

Each component for forming the above coated layer may be used after being dissolved in water or a hydrophilic solvent such as methyl alcohol, ethyl alcohol or isopropyl alcohol, but it is ordinarily used in the form of an aqueous solution. The concentration of each component in the solution is generally 0.1 to 10 wt. %, preferably 0.3 to 5 wt. % based on the total weight of the solution.

The solution may be coated on a thermoplastic resin film by conventional methods known to those of ordinary skill in the art, such as by means of a bar coater, roll coater, blade coater, air knife coater or size press coater and then dried to form a coated film.

The coating weight may be generally 0.005 to 10 g/m², preferably 0.02 to 5 g/m² in terms of a solid content.

EXAMPLES

Having generally described this invention, a further understanding can be obtained by reference to certain specific examples which are provided herein for the purpose of illustration and are not intended to be limiting unless otherwise specified. Incidentally, in examples, part or parts and % mean part or parts by weight and wt. %, respectively.

Preparation of Synthetic Paper

Preparation Example 1: Synthetic Paper (P-1)

(1) Composition (C") obtained by mixing 88 parts of polypropylene having a melt flow rate (MFR) of 0.8 g/10 min and a melting point of 164° C. with 12 parts of heavy calcium carbonate having an average particle size of 1.5 μm was kneaded in an extruder set at 270° C., followed by extrusion into a sheet through a die. The extrudate was cooled by a cooling apparatus, whereby an unstretched sheet was obtained.

The sheet so obtained was heated at 140° C., followed by stretching 5 times in the machine direction.

(2) Composition (A") obtained by mixing 49 parts of polypropylene having an MFR of 4.0 g/10 min, 5 parts of maleic-acid(modifying monomer)-graft-modified polypropylene having a maleic acid content of 0.5% by weight and 46 parts of calcium carbonate having an average particle size of 1.5 μm (the maleic acid content as a modifying monomer: 0.05 part per 100 parts of the filler) was melt kneaded in an extruder set at 270° C. Separately, Composition (B") obtained by mixing 55 parts of polypropylene having an MFR of 4.0 g/10 min with 45 parts of heavy calcium carbonate having an average particle size of 1.5 μm was melt kneaded in another extruder set at 270° C. The melt-kneaded compositions (A") and (B") were laminated in a die and co-extruded on both sides of the sheet, which had been obtained above in (1) by stretching 5 times in the machine direction, with composition (A") containing the modified polypropylene as an outer layer to obtain a 5-layered laminated sheet having a structure of A"/B"/C"/B"/A".

The 5-layer laminated sheet was then heated to 155° C., followed by stretching 7.5 times in the transverse direction to prepare 5-layered stretched synthetic paper (P-1) having a thickness of 5/20/50/20/5 μm.

Preparation Example 2: Synthetic Paper (P-2)

(1) Composition (C") obtained by mixing 79 parts of polypropylene having a melt flow rate (MFR) of 0.8 g/10 min, 5 parts of high-density polyethylene and 16 parts of heavy calcium carbonate having an average particle size of 1.5 μm was kneaded in an extruder set at 270° C., followed by extrusion into a sheet through a die. The extrudate was cooled by a cooling apparatus, whereby an unstretched sheet was obtained.

The sheet so obtained was heated to 140° C. and then, stretched 5 times in the machine direction.

(2) Composition (A") of polypropylene having a MFR of 4.0 g/10 min and Composition (B") obtained by mixing 55 parts of polypropylene having an MFR of 4.0 g/10 min with 45 parts of calcium carbonate having an average particle size of 1.5 μm were melt-kneaded in separate extruders set at 270° C., respectively. They were laminated in a die and co-extruded on both sides of the sheet, which had been obtained-above in (1) by stretching 5 times in the machine direction, with Composition (A") as an outer layer. The laminated sheet so obtained was then subjected to cooling to 60° C., heating to about 160° C., stretching 7.5 times in the transverse direction by a tenter, annealing treatment at 165° C., cooling to 60° C., and trimming successively, whereby Synthetic Paper (P-2) having a 5-layered structure of A"/B"/C"/B"/A" (30 μm/3 μm/64 μm/3 μm/30 μm) was obtained.

Preparation of Coating Agent (A) Anionic Surfactant

As an anionic surfactant, the following ones were used.

"Suftomer ST6000" (trade name; maleate copolymer surfactant of Mitsubishi Chemical Co., Ltd.)

"Suftomer AP134" (trade name; maleate copolymer surfactant of Mitsubishi Chemical Co., Ltd.)

"Chemistadt SA9" (trade name; polystyrene-sulfonate surfactant of Sanyo Chemical Industries, Ltd.)

"Chemistadt 6120" (trade name; polystyrene-sulfonate surfactant of Sanyo Chemical Industries, Ltd.)

"Chemistadt SA136" (trade name; polystyrene-sulfonate surfactant of Sanyo Industries, Ltd.)

(B) Nonionic Surfactant

As a nonionic surfactant, the following ones were used.

"PEG 1000" (trade name; polyethylene glycol having a molecular weight (Mn) of 1,000; product of Sanyo Chemical Industries, Ltd.)

Polyoxyethylene lauryl ether oxyethylene having a polymerization degree of 23; product of Wako Pure Chemical Industries, Ltd.

Polyoxyethylene sorbitan trioleate oxyethylene having a polymerization degree of 20; product of Wako Pure Chemical Industries, Ltd.

(C) Cationic Surfactant

As a cationic surfactant, the following ones were used.

"Coatamine 86W" (trade name; stearyltrimethylammonium chloride; product of Kao Corporation)

"Coatamine 60W" (trade name; cetyltrimethylammonium chloride; product of Kao Corporation)

In addition, a quaternary ammonium salt copolymer (I) and components (II) and (III) were employed.

(I) Quaternary Ammonium Salt Copolymer (I-1)

In a four-necked flask equipped with a reflux condenser, thermometer, a glass tube for nitrogen displacement and a stirrer were charged 35 parts of dimethylaminoethyl methacrylate, 20 parts by ethyl methacrylate, 20 parts of cyclohexyl methacrylate, 25 parts of stearyl methacrylate, 150 parts of ethyl alcohol and 1 part of azobisisobutyronitrile. Polymerization was conducted at 80° C. for 6 hours in a nitrogen gas stream.

To the reaction mixture was added 70 parts of a 60% aqueous solution of 3-chloro-2-hydroxypropyltrimethylammonium chloride, followed by reaction at 80° C. for 15 hours. While dropwise adding water, ethyl alcohol was removed by distillation, whereby a quaternary ammonium salt copolymer (I-1) having a final solid content of 20% was obtained.

(I-2)

In the same manner as for the copolymer A-1, a mixture of 30 parts of dimethylaminopropyl methacrylamide, 30 parts of ethyl methacrylate, 40 parts of butyl methacrylate and 150 parts of ethyl alcohol and 1 part of azobisisobutylonitrile was subjected to polymerization at 80° C. in a nitrogen gas stream for 6 hours.

To the reaction mixture was added 55 parts of a 60% aqueous solution of 3-chloro-2-hydroxypropyltrimethylammonium chloride, followed by reaction at 80° C. for 15 hours. While dropwise adding water, ethyl alcohol was distilled off, whereby a quaternary ammonium salt copolymer (I-2) having a final solid content of 20% was obtained.

(II) Polyethyleneimine Polymer

As a polyethyleneimine polymer, the following ones were used.

AC-72 ("Suftomer", trade name; butyl-chloride-modified polyethyleneimine; product of Mitsubishi Chemical Co., Ltd.)

P-SN ("Polymine SN", trade name; polyaminepolyamide-polyethyleneimine adduct; product of BASF AG)

(III) Polyaminepolyamide-epichlorohydrin Adduct

As a polyaminepolyamide-epichlorohydrin adduct, the following one was used.

"WS-570" (trade name; product of PMC/Japan)

(D) Amphoteric Surfactant

As an amphoteric surfactant, the following one was used.

"Amphitole 20BS" (trade name; laurylbetaine; product of Kao Corporation)

In addition to the most suited betaine type amphoteric coplymer (V) and the above components (II) and (III) were employed.

(V) Betaine Type Amphoteric Copolymer (V-1)

In a four-necked flask equipped with a reflux condenser, thermometer, a glass tube for nitrogen displacement and a stirrer were charged 34 parts of dimethylaminoethyl methacrylate, 20 parts by ethyl methacrylate, 15 parts of cyclohexyl methacrylate, 23 parts of stearyl methacrylate, 8 parts of N-vinyl pyrrolidone, 150 parts of isopropanol and 0.6 part of azobisisobutyronitrile. Polymerization was conducted at 80° C. for 3 hours in a nitrogen gas stream.

To the reaction mixture was added dropwise a solution of 30 parts of sodium monochloroacetate and 70 parts of water, followed by reaction at 80° C. for 3 hours. Then, the system was substituted with water, whereby a betaine type amphoteric copolymer (V-1) having a final solid content of 30% was obtained.

Evaluation

Surface resistivity, and transfer and adhesion of offset printing ink were evaluated by the measuring method described below.

(1) Surface Resistivity

The surface resistivity of the synthetic paper so obtained was measured using a surface resistivity meter "HIRESTA MODEL HT-250" (trade name; product of Mitsubishi Chemical Co., Ltd.) under conditions of 23° C. and 50% relative humidity.

(Synthetic paper having a surface resistivity of $5 \times 10^{12} \Omega$/is judged to permit good paper feed and discharge)

(2) Offset Printability After Storage at 23° C. and 50% RH

Measurement of Ink Adhesion

After stored under the atmosphere of 23° C. and 50% relative humidity for 3 days, the synthetic paper coated with a coating agent was printed by means of the "RI Tester" (manufactured by Akira Seisakasho) using an ultraviolet curing ink ["Bestcure 161"; trade name; product of T&K Toka Co., Ltd.) at a coating weight of about 2 g/m². The print was passed once at a speed of 10 m/min under a metal halide lamp (80 w/cm) manufactured by Eye Graphic Co., Ltd. placed 10 cm above. A piece of adhesive tape "Cellotape" (trade mark; product of Nichiban Co., Ltd.) was intimately applied onto the ink surface and then quickly peeled off. The ink transfer was rated by the following 5-grade adhesion conditions as follows:

5: The ink layer did not peel off at all.

4: A small portion of the ink layer peeled off.

3: The peeled area of the ink layer was not more than 25%.

2: The peeled area of the ink layer was between 25% and 50%.

1: The peeled area of the ink layer was 50% or more.

Measurement of Ink Transfer

After stored under the atmosphere of 23° C. and 50% relative humidity for 3 days, the synthetic paper coated with a coating agent was printed by means of the "RI Tester" (manufactured by Akira Seisakusho) using the above-described "Bestcure 161" at a coating weight of about 1.5 g/m². The optical reflection density (Macbeth density) was measured using a Macbeth illuminometer of Colmogen Inc./U.S.A. The paper exhibiting the Macbeth density of at least 1.5 is regarded to come up to the standard.

(3) Offset Printability After Storage at 40° C. and 80% RH

Measurement of Ink Adhesion

After stored under the atmosphere of 40° C. and 80% relative humidity for 3 days, the synthetic paper coated with a coating agent was printed by means of the "RI Tester" (manufactured by Akira Seisakusho) using the above-described ink of "BestCure 161" at a coating weight of about 2 g/m². The print was passed once at a speed of 10 m/min under a metal halide lamp (80 w/cm) manufactured by Eye Graphic Co., Ltd. placed 10 cm above. A piece of "Cellotape" was intimately applied onto the ink surface and then quickly peeled off. The ink transfer was rated by the following 5-grade adhesion conditions as follows:

5: The ink layer did not peel off at all.

4: A small portion of the ink layer peeled off.

3: The peeled area of the ink layer was not more than 25%.

2: The peeled area of the ink layer was between 25% and 50%.

1: The peeled area of the ink layer was 50% or more.

Measurement of Ink Transfer

After stored under the atmosphere of 40° C. and 80% relative humidity for 3 days, a polypropylene resin film coated with a primer coating agent was printed by means of the "RI Tester" (manufactured by Akira Seisakusho) using the above-described "Bestcure 161" at a coating weight of about 1.5 g/m². The optical reflection density (Macbeth density) of the printed surface was measured using a Macbeth illuminometer of Colmogen Inc./U.S.A. The paper exhibiting the Macbeth density of at least 1.5 is regarded to come up to the standard.

Example 1

An aqueous solution of "Suftomer ST6000" having an initial solid concentration of 30 wt. % was diluted to give a solid concentration of 0.2 wt. %, followed by thorough stirring, whereby an anionic-surfactant-containing coating solution was prepared.

On the other hand, both sides of Synthetic paper (P-1) obtained in Preparation Example 1 were flame-treated using propane as a flammable gas and a "FLYNN F 3000 Direct Flame Plasma Treatment Apparatus" (trade name; product of FLYNN BURNER) at an applied energy of 37,700 J/m$^2$ and a line velocity of 40 m/min. Onto one of the sides of the synthetic paper thus flame-treated, the above coating solution was applied by a bar coater to give a solid content of 0.1 g/m$^2$, followed by drying at 65° C. to form a film.

The surface resistivity and transfer and adhesion of ink of the resulting synthetic paper having a coated layer were evaluated. The results are shown in Table 1.

Examples 2 to 11

In each of Examples 2 to 11, under the conditions as described in Table 1 or 2, Synthetic paper (P-1) was flame-treated and then on one side of the paper, a coating agent having the composition as shown in Table 1 or 2 was applied, whereby coated synthetic paper was obtained.

The coated synthetic paper so obtained had surface resistivity and printability as shown in Table 1 or 2.

Comparative Examples 1 to 6

In each of Comparative Examples 1 to 6, evaluation was conducted in a similar manner to Example 1 except for the employment of the surface treatment and coating agent composition as shown in Table 1 or 2.

Incidentally, corona discharge treatment was carried out using "HFS400F" (trade name; product of Kasuga Denki Co., Ltd.) as a corona discharge treatment apparatus, an aluminum-made electrode of 0.8 m long and a silicone-covered electrode as a treater roll. At that time, the gap between the electrode and the roll was set at 5 mm, the line treating velocity was 15 m/min and applied energy density was 70 W/m$^2$/min.

Example 12

The above-described quaternary ammonium salt type copolymer was diluted to formulate the below-described composition containing each component in an amount in terms of effective ingredient based on the total weight of the composition, followed by thorough stirring, whereby a cationic-surfactant-containing coating solution was prepared.

Component I: I-1 0.5 wt. %

Component II: AC-72 0.4 wt. %

Component III: WS570 0.5 wt. %

Component IV: NaCO$_3$ 0.1 wt. %

On the other hand, both sides of Synthetic paper (P-1) obtained in Preparation Example 1 were flame-treated using propane as a flammable gas and a "FLYNN F 3000 Direct Flame Plasma Treatment Apparatus" (trade name; product of FLYNN BURNER) at an applied energy of 37,700 J/m$^2$ and a line velocity of 40 m/min. Onto one of the flame-treated sides of the synthetic paper, the above coating solution was applied by a roller to give a solid content of 0.05 g/m$^2$. The coated film was dried at 65° C. to form a film and then rolled up.

The surface resistivity, and transfer and adhesion of ink of the resulting synthetic paper after stored at 23° C. and 50% RH or at 40° C. and 80% RH were evaluated by the above-described evaluation method. The results are shown in Table 3.

Examples 13 to 20

In each of Examples 13 to 20, under the conditions as described in Table 3 or 4, Synthetic paper (P-1 or P-2) was flame-treated and then on one side of the paper, a coating agent having the composition as shown in Table 3 or 4 was applied, whereby coated synthetic paper was obtained.

The coated synthetic paper so obtained had excellent printability as shown in Table 3 or 4.

Comparative Examples 7 to 12

In a similar manner to Example 13 except for the employment of the surface treatment, coating agent composition and synthetic paper (P-1 or P-2) as shown in Table 5, evaluation was carried out.

Incidentally, corona discharge treatment was carried out using "HFS400F" (trade name; product of Kasuga Denki) as a corona discharge treatment apparatus, an aluminum-made electrode of 0.8 m long and a silicone-covered electrode as a treater roll, with the gap between the electrode and the roll set at 5 mm, the line treating velocity at 15 m/min and applied energy density at 70 W/m$^2$/min.

TABLE 1

| | Surface | | Evaluation | | |
| | | | | UV ink | |
| | Base layer | treatment energy (J/m$^2$ or W/m$^2$/min) | Surfactant used* | Surface resistivity $\Omega/\square$ | Transfer | Adhesion |
|---|---|---|---|---|---|---|
| Ex. 1 | Synthetic paper P-1 | Flame treatment 37,700 | ST60Q0 | 2.2 × 10$^{12}$ | 1.66 | 5 |
| Comp. Ex. 1 | Synthetic paper P-1 | Flame treatment 37,700 | — | 1.0 × 10$^{15}$< | 1.72 | 5 |
| Comp. Ex. 2 | Synthetic paper P-1 | Flame treatment 6,000 | ST6000 | 1.7 × 10$^{13}$ | 1.70 | 2 |
| Comp. Ex. 3 | Synthetic paper P-1 | Corona discharge treatment 70(*) | ST6000 | 1.2 × 10$^{13}$ | 1.61 | 1 |
| Ex. 2 | Synthetic paper P-1 | Flame treatment 51,900 | AP134 | 1.1 × 10$^{12}$ | 1.69 | 5 |
| Ex. 3 | Synthetic paper P-1 | Flame treatment 69,200 | Chemistadt SA9 | 8.6 × 10$^9$ | 1.72 | 5 |
| Ex. 4 | Synthetic paper P-1 | Flame treatment 51,900 | Chemistadt 6120 | 1.7 × 10$^{10}$ | 1.66 | 5 |
| Ex. 5 | Synthetic paper P-1 | Flame treatment 51,900 | Chemistadt SA136 | 6.2 × 10$^{10}$ | 1.77 | 5 |

*surfactant content in the coating agent: 0.2 wt. %
(*)W/m$^2$/min

TABLE 2

| | Base layer | Surface treatment energy (J/m² or W/m²/min) | Surfactant used* | Surface resistivity Ω/□ | UV ink Transfer | UV ink Adhesion |
|---|---|---|---|---|---|---|
| Ex. 6 | Synthetic paper P-1 | Flame treatment 37,700 | Coatamine 86W | $1.1 \times 10^{10}$ | 1.72 | 5 |
| Ex. 7 | Synthetic paper P-1 | Flame treatment 37,700 | Coatamine 60W | $2.1 \times 10^{11}$ | 1.78 | 5 |
| Comp. Ex. 4 | Synthetic paper P-1 | Corona discharge treatment 70(*) | Coatamine 86W | $1.3 \times 10^{10}$ | 1.64 | 1 |
| Ex. 8 | Synthetic paper P-1 | Flame treatment 37,700 | Amphitole 20BS | $2.7 \times 10^{11}$ | 1.65 | 5 |
| Comp. Ex. 5 | Synthetic paper P-1 | Corona discharge treatment 70(*) | Amphitole 20BS | $3.5 \times 10^{11}$ | 1.69 | 1 |
| Ex. 9 | Synthetic paper P-1 | Flame treatment 51,900 | PEG1000 | $4.2 \times 10^{12}$ | 1.60 | 5 |
| Ex. 10 | Synthetic paper P-1 | Flame treatment 51,900 | Polyoxyethylene lauryl ether | $3.7 \times 10^{11}$ | 1.67 | 5 |
| Comp. Ex. 6 | Synthetic paper P-1 | Corona discharge treatment 70(*) | Polyoxyethylene lauryl ether | $6.8 \times 10^{11}$ | 1.74 | 1 |
| Ex. 11 | Synthetic paper P-1 | Flame treatment 51,900 | Polyoxyethylene sorbitan trioleate | $1.1 \times 10^{12}$ | 1.62 | 5 |

*surfactant content in the coating agent: 0.2 wt. %
(*)W/m²/min

TABLE 3

| | Base layer | Surface treatment energy (J/m² or W/m²/min) | Composition of Coating agent | Surface resistivity (Ω/□) | at 23° C and 50% RH Transfer | at 23° C and 50% RH Adhesion | at 40° C and 80% RH Transfer | at 40° C and 80% RH Adhesion |
|---|---|---|---|---|---|---|---|---|
| Ex. 12 | Synthetic paper P-1 | Flame treatment 34,600 | I-1: 0.5% AC72: 0.4% WS570: 0.5% Na₂CO₃: 0.1% | $4.9 \times 10^{10}$ | 1.70 | 5 | 1.65 | 5 |
| Ex. 13 | Synthetic paper P-1 | Flame treatment 51,900 | I-1: 0.5% AC72: 0.4% WS570: 0.5% Na₂CO₃: 0.1% | $4.9 \times 10^{10}$ | 1.70 | 5 | 1.68 | 5 |
| Ex. 14 | Synthetic paper P-1 | Flame treatment 69,200 | I-1: 0.5% AC72: 0.4% WS570: 0.5% Na₂CO₃: 0.1% | $5.2 \times 10^{10}$ | 1.71 | 5 | 1.70 | 5 |
| Ex. 15 | Synthetic paper P-1 | Flame treatment 51,900 | I-2: 0.7% AC72: 0.4% WS570: 0.3% Na₂CO₃: 0.1% | $5.7 \times 10^{10}$ | 1.70 | 5 | 1.66 | 5 |
| Ex. 16 | Synthetic paper P-1 | Flame treatment 51,900 | V-1: 1.0% P-SN: 0.25% WS570: 0.3% Na₂CO₃: 0.1% | $8.2 \times 10^{9}$ | 1.69 | 5 | 1.65 | 5 |

TABLE 4

| | Base layer | Surface treatment energy (J/m² or W/m²/min) | Composition of Coating agent | Evaluation | | | | |
|---|---|---|---|---|---|---|---|---|
| | | | | Surface resistivity (Ω/□) | at 23° C and 50% RH | | at 40° C and 80% RH | |
| | | | | | Transfer | Adhesion | Transfer | Adhesion |
| Ex. 17 | Synthetic paper P-2 | Flame treatment 51,900 | I-1: 0.5% AC72: 0.4% WS570: 0.5% Na₂CO₃: 0.1% | 5.8 × 10¹⁰ | 1.88 | 5 | 1.85 | 5 |
| Ex. 18 | Synthetic paper P-1 | Flame treatment 34,600 | I-1: 1.0% AC72: 0.5% | 1.5 × 10¹⁰ | 1.72 | 5 | 1.54 | 5 |
| Ex. 19 | Synthetic paper P-2 | Flame treatment 51,900 | I-1: 1.0% AC72: 0.5% | 2.4 × 10¹⁰ | 1.86 | 5 | 1.66 | 5 |
| Ex. 20 | Synthetic paper P-1 | Flame treatment 51,900 | I-1: 1.0% AC72: 0.25% WS570: 0.3% Na₂CO₃: 0.1% PEG1000: 1.5% | 4.2 × 10⁹ | 1.71 | 5 | 1.65 | 5 |

TABLE 5

| | Base layer | Surface treatment energy (J/m² or W/m²/min) | Composition of Coating agent | Evaluation | | | | |
|---|---|---|---|---|---|---|---|---|
| | | | | Surface resistivity (Ω/□) | at 23° C and 50% RH | | at 40° C and 80% RH | |
| | | | | | Transfer | Adhesion | Transfer | Adhesion |
| Comp. Ex. 7 | Synthetic paper P-1 | Flame treatment 6,000 | 1-1: 0.5% AC72: 0.4% WS570:0.5% Na₂CO₃: 0.1% | 8.9 × 10¹⁰ | 1.68 | 5 | 1.37 | 4 |
| Comp. Ex. 8 | Synthetic paper P-1 | Corona discharge treatment 70(*) | I-1: 0.5% AC72: 0.4% WS570: 0.5% Na₂CO₃: 0.1% | 6.9 × 10¹⁰ | 1.70 | 5 | 1.25 | 4 |
| Comp. Ex. 9 | Synthetic paper P-1 | Corona discharge treatment 70(*) | V-1: 0.5% P-SN: 0.25% WS570: 0.3% Na₂CO₃: 0.1% | 8.7 × 10⁹ | 1.67 | 5 | 1.20 | 2 |
| Comp. Ex. 10 | Synthetic paper P-2 | Corona discharge treatment 70(*) | I-1: 0.5% AC72: 0.4% WS570: 0.5% Na₂CO₃: 0.1% | 6.2 × 10¹⁰ | 1.89 | 5 | 1.02 | 2 |
| Comp. Ex. 11 | Synthetic paper | Flame treatment 34,600 | — | 1.0 × 10¹⁵< | 1.67 | 5 | 1.67 | 5 |
| Comp. Ex. 12 | Synthetic paper P-2 | Flame treatment 51,900 | — | 1.0 × 10¹⁵< | 1.91 | 5 | 1.90 | 5 |

(*)W/m²/min

While the invention has been described in detail and with reference to specific examples thereof, it will be apparent to one of skill in the art that various changes are modifications can be made therein without departing from the spirit and scope thereof.

This application is-based in part on Japanese patent application JP 8-264,674 filed with the Japanese patent office on Oct. 4, 1996 and JP 9-224429 file with the Japanese patent office on Aug. 7, 1997, the entire contents of each being hereby incorporated by reference.

What is claimed is:

1. A thermoplastic polypropylene resin film comprising a surface subjected to a flame treatment at an energy of 34,600 to 138,400 joule/m² and provided thereon a coated layer comprised of at least one surfactant selected from the group consisting of anionic surfactants (A), nonionic surfactants (B), cationic surfactants (C) and amphoteric surfactants (D).

2. The thermoplastic resin film of claim 1, wherein said anionic surfactant (A) is selected from the group consisting of carboxylate surfactants, sulfonate surfactants and a mixture thereof.

3. The thermoplastic resin film of claim 1, wherein said anionic surfactant (A) is selected from the group consisting of maleate surfactants, polystyrene-sulfonate surfactants and a mixture thereof.

4. The thermoplastic resin film of claim 1, wherein said nonionic surfactant (B) is selected from the group consisting of polyethylene glycol surfactants, polyhydric alcohol surfactants and a mixture thereof.

5. The thermoplastic resin film of claim 1, wherein said nonionic surfactant (B) is selected from the group consisting of polyethylene glycol surfactants, polyoxyethylene lauryl ether surfactants, polyoxyethylene sorbitan trioleate surfactants and a mixture thereof.

6. The thermoplastic resin film of claim 1, wherein said cationic surfactant (C) is a quaternary ammonium salt surfactant represented by the following formula (34):

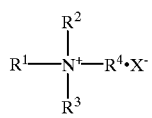

(34)

wherein $R^1$ represents a $C_{4-30}$ alkyl or $C_{4-30}$ alkenyl group or an amide-bond-containing group, $R^2$, $R^3$ and $R^4$ are the same or different and individually represents a $C_{1-3}$ alkyl, methoxy, ethoxy or benzyl group and $X^-$ represents $Cl^-$, $I^-$, $CH_3SO_4^-$, $C_{12}H_{25}$—Ø—$SO_3^-$ in which Ø represents an aromatic ring of $C_6H_4$.

7. The thermoplastic resin film of claim 1, wherein said cationic surfactant (C) is selected from the group consisting of stearyltrimethylammonium chloride, cetyltrimethylammonium chloride and a mixture thereof.

8. The thermoplastic resin film of claim 1, wherein said cationic surfactant (C) is a water-soluble quaternary ammonium salt copolymer containing a structural unit represented by the following formula (35):

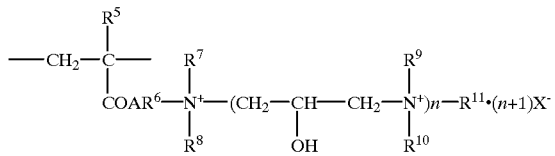

(35)

wherein A represents —O— or —NH—, $R^5$ represents a hydrogen atom or a methyl group, $R^6$ represents a $C_{2-4}$ alkylene group or —$CH_2$—CH(OH)—$CH_2$—, $R^7$, $R^8$, $R^9$ and $R^{10}$ are the same or different and each independently represents a $C_{1-3}$ alkyl group, $R^{11}$ represents a $C_{1-10}$ alkyl group or a $C_{7-10}$ aralkyl group, n stands for an integer of from 1 to 3, and X represents a chlorine, bromine or iodine atom.

9. The thermoplastic-resin film of claim 1, wherein said amphoteric surfactant (D) is a betaine amphoteric surfactant represented by the following formula (36):

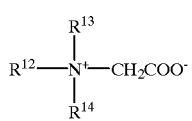

(36)

wherein $R^{12}$ represents a $C_{4-30}$ alkyl or $C_{4-30}$ alkenyl group, and $R^{13}$ and $R^{14}$ are the same or different and individually represents a $C_{1-3}$ alkyl, methoxy or ethoxy group.

10. The thermoplastic resin film of claim 1, wherein said amphoteric surfactant (D) is selected from the group consisting of stearyldimethylbetaine, lauryldihydroxybetaine, lauryldimethylbetaine, laurylbetaine and a mixture thereof.

11. The thermoplastic resin film of claim 1, wherein said amphoteric surfactant is a betaine amphoteric copolymer containing a structural unit (D) represented by the following formula (37):

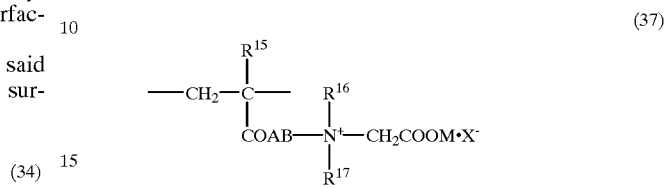

(37)

wherein A represents —O— or —NH—, B represents a $C_{2-6}$ alkylene group, $R^{15}$ represents a hydrogen atom or a methyl group, $R^{16}$ and $R^{17}$ each represents a $C_{1-4}$ alkyl group, X represents a chlorine, bromine or iodine atom, and M represents an alkali metal ion.

12. The thermoplastic resin film of claim 1, which is synthetic paper composed of a stretched polypropylene film containing a fine inorganic powder.

13. The thermoplastic resin film of claim 1, wherein a coating weight of said coated layer is 0.005 to 10 g/m² in terms of the solid content.

14. A thermoplastic polypropylene resin film comprising a surface subjected to flame treatment at an energy of 34,600 to 138,400 joule/m² and provided thereon a coated layer comprising a water-soluble quaternary ammonium salt copolymer (I) containing a structural unit (a) represented by the following formula (38):

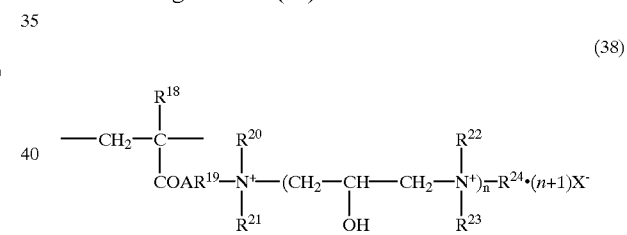

(38)

wherein A represents —O— or —NH—, $R^{18}$ represents a hydrogen atom or a methyl group, $R^{19}$ represents a $C_{2-4}$ alkylene group or —$CH_2$—CH(OH)—$CH_2$—, $R^{20}$, $R^{21}$, $R^{22}$ and $R^{23}$ are the same or different and each independently represents a $C_{1-3}$ alkyl group, $R^{24}$ represents a $C_{1-10}$ alkyl group or a $C_{7-10}$ aralkyl group, n stands for an integer of from 1 to 3, and X represents a chlorine, bromine or iodine atom, a structural unit (b) represented by the following formula (39):

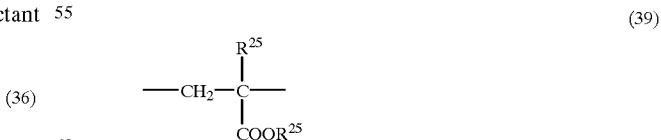

(39)

wherein $R^{25}$ represents a hydrogen atom or a methyl group, $R^{26}$ represents a $C_{1-22}$ alkyl group, $C_{7-22}$ aralkyl group or $C_{5-22}$ cycloalkyl group, and a structural unit (c) derived from a monomer copolymerizable with the components (a) and (b), the copolymerization ratio of said components (a), (b) and (c) falling within a range of 30 to 70:30 to 70:0 to 40.

15. The thermoplastic resin film of claim 14, wherein said structural unit (b) is formed of the monomer combination selected from the group consisting of methyl methacrylate and ethyl methacrylate and the group consisting of a $C_{4-22}$ alkyl methacrylate and cyclohexyl methacrylate.

16. The thermoplastic resin film of claim 14, wherein said water-soluble quaternary ammonium salt copolymer (I) has been obtained by modifying a dimethylaminoethyl methacrylate-ethyl methacrylate-cyclohexyl methacrylate-stearyl methacrylate copolymer with 3-chloro-2-hydroxypropyltrimethylammonium chloride.

17. The thermoplastic resin film of claim 14, wherein said water-soluble quaternary ammonium salt copolymer (I) has been obtained by modifying a dimethylaminopropyl methacrylamide-ethyl methacrylate-butyl methacrylate copolymer with 3-chloro-2-hydrexypropyltrimethylammonium chloride.

18. The thermoplastic resin film of claim 14, wherein said coated layer comprises, based on 100 parts by weight of said water-soluble quaternary ammonium salt copolymer (I), (II) 10 to 600 parts by weight of a polyethyleneimine polymer selected from the group consisting of polyethyleneimine, poly(ethyleneimine-urea), polyamine-polyamide-polyethyleneimine adduct, alkylated ($C_{1-8}$ alkyl chain) polyethyleneimine and a mixture thereof.

19. The thermoplastic resin film of claim 18, wherein said coated layer further comprises, based on 100 parts by weight of the water-soluble quaternary ammonium salt copolymer (I), (III) 5 to 500 parts by weight of a polyamine-polyamide-epichlorohydrin adduct and (IV) 5 to 200 parts by weight of an alkali metal salt or alkaline earth metal salt.

20. The thermoplastic resin film of claim 14, which is synthetic paper composed of a stretched polypropylene film containing a fine inorganic powder.

21. The thermoplastic resin film of claim 14, wherein a coating weight of said coated layer is 0.005 to 10 g/m² in terms of the solid content.

22. A thermoplastic polypropylene resin film comprising a surface subjected to flame treatment at an energy of 34,600 to 138,400 joule/m² and provided thereon a coated layer comprising a betaine amphoteric copolymer (V) containing a structural unit (d) represented by the following formula (40):

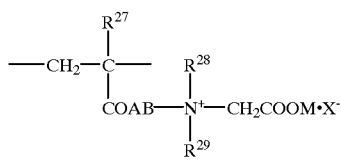

(40)

wherein A represents —O— or —NH—, B represents a $C_{2-6}$ alkylene group, $R^{27}$ represents a hydrogen atom or a methyl group, $R^{28}$ and $R^{29}$ each represents a $C_{1-4}$ alkyl group, X represents a chlorine, bromine or iodine atom, and M represents an alkali metal ion; a structural unit (41) represented by the following formula (e):

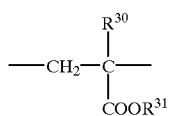

(41)

wherein $R^{30}$ represents a hydrogen atom or a methyl group, $R^{31}$ represents a $C_{1-22}$ alkyl group, $C_{7-22}$ aralkyl group or $C_{5-22}$ cycloalkyl group; a structural unit (42) represented by the following formula (f):

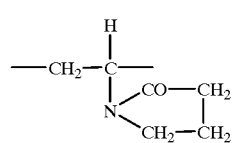

(42)

and a structural unit (g) derived from a monomer copolymerizable with the component (d), (e) and (f), the copolymerizable weight ratio of said components (d), (e), (f) and (g) falling within a range of 25 to 45:30 to 70:0 to 25:0 to 25.

23. The thermoplastic resin film of claim 22, wherein said structural unit (e) is formed of the monomer combination selected from the group consisting of methyl methacrylate and ethyl methacrylate and the group consisting of a $C_{4-22}$ alkyl methacrylate and cyclohexyl methacrylate.

24. The thermoplastic resin film of claim 22, wherein said betaine amphoteric copolymer (V) has been obtained by modifying a dimethylaminoethyl methacrylate-ethyl methacrylate-cyclohexyl methacrylate-stearyl methacrylate-N-vinyl pyrrolidone copolymer with sodium monochloroacetate.

25. The thermoplastic resin film of claim 22, wherein said coated layer comprises, based on 100 parts by weight of said betaine amphoteric copolymer (V), (II) 10 to 600 parts by weight of a polyethyleneimine polymer selected from the group consisting of polyethyleneimine, poly(ethyleneimine-urea), polyaminepolyamide-polyethyleneimine adduct, $C_{1-8}$ polyethyleneimine and a mixture thereof.

26. The thermoplastic resin film of claim 22, wherein said coated layer further comprises, based on 100 parts by weight of the betaine amphoteric copolymer (V), (III) 5 to 500 parts by weight of a polyaminepolyamide-epichlorohydrin adduct and (IV) 5 to 200 parts by weight of an alkali metal salt or alkaline earth metal salt.

27. The thermoplastic resin film of claim 22, which is synthetic paper composed of a stretched polypropylene film containing a fine inorganic powder.

28. The thermoplastic resin film of claim 22, wherein a coating weight of said coated layer is 0.005 to 10 g/m² in terms of the solid content.

29. A method of preparing a thermoplastic resin film comprising:
   a) subjecting a thermoplastic polypropylene resin film to flame treatment at an energy of 34,600 to 138,400 joules/m²; and
   b) coating a flame treated surface of said thermoplastic resin film with a coating layer comprising at least one surfactant selected from the group consisting of anionic surfactants (A), nonionic surfactants (B), cationic surfactants (C) and amphoteric surfactants (D).

30. In a thermoplastic resin film comprising a surface subjected to a flame treatment, the improvement wherein said flame treatment is at an energy of 8,000 to 150,000 joule/m², and provided thereon a coated layer comprised of at least one surfactants selected from the group consisting of anionic surfactants (A), nonionic surfactants (B), cationic surfactants (C) and amphoteric surfactants (D).

31. The thermoplastic resin film of claim 30, wherein said anionic surfactant (A) is selected from the group consisting of carboxylate surfactants, sulfonate surfactants and a mixture thereof.

32. The thermoplastic resin film of claim 30, wherein said anionic surfactant (A) is selected from the group consisting of maleate surfactants, polystyrene-sulfonate surfactants and a mixture thereof.

33. The thermoplastic resin film of claim 30, wherein said nonionic surfactant (B) is selected from the group consisting of polyethylene glycol surfactants, polyhydric alcohol surfactants and a mixture thereof.

34. The thermoplastic resin film of claim 30, wherein said nonionic surfactant (B) is selected from the group consisting of polyethylene glycol surfactants, polyoxyethylene lauryl ether surfactants, polyoxyethylene sorbitan trioleate surfactants and a mixture thereof.

35. The thermoplastic resin film of claim 30, wherein said cationic surfactant (C) is a quaternary ammonium salt surfactant represented by the following formula (34):

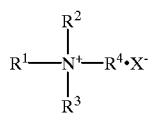

(34)

wherein $R^1$ represents a $C_{4-30}$ alkyl or $C_{4-30}$ alkenyl group or an amide-bond-containing group, $R^2$, $R^3$ and $R^4$ are the same or different and individually represents a $C_{1-3}$ alkyl, methoxy, ethoxy or benzyl group and $X^-$ represents $Cl^-$, $I^-$, $CH_3SO_4^-$, $C_{12}H_{25}$—Ø—$SO_3^-$ in which ø represents an aromatic ring of $C_6H_4$.

36. The thermoplastic resin film of claim 30, wherein said cationic surfactant (C) is selected from the group consisting of stearyltrimethylammonium chloride, cetyltrimethylammonium chloride and a mixture thereof.

37. The thermoplastic resin film of claim 30, wherein said cationic surfactant (C) is a water-soluble quaternary ammonium salt copolymer containing a structural unit represented by the following formula (35):

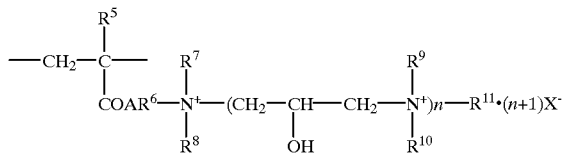

(35)

wherein A represents —O— or —NH—, $R^5$ represents a hydrogen atom or a methyl group, $R^6$ represents a $C_{2-4}$ alkylene group or —$CH_2$—CH(OH)—$CH_2$—, $R^7$, $R^8$, $R^9$ and $R^{10}$ are the same or different and each independently represents a $C_{1-3}$ alkyl group, $R^{11}$ represents a $C_{1-10}$ alkyl group or a $C_{7-10}$ aralkyl group, n stands for an integer of from 1 to 3, and X represents a chlorine, bromine or iodine atom.

38. The thermoplastic-resin film of claim 30, wherein said amphoteric surfactant (D) is a betaine amphoteric surfactant represented by the following formula (36):

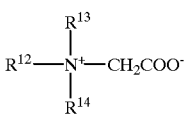

(36)

wherein $R^{12}$ represents a $C_{4-30}$ alkyl or $C_{4-30}$ alkenyl group, and $R^{13}$ and $R^{14}$ are the same or different and individually represents a $C_{1-3}$ alkyl, methoxy or ethoxy group.

39. The thermoplastic resin film of claim 30, wherein said amphoteric surfactant (D) is selected from the group consisting of stearyldimethylbetaine, lauryldihydroxybetaine, lauryldimethylbetaine, laurylbetaine and a mixture thereof.

40. The thermoplastic resin film of claim 30, wherein said amphoteric surfactant is a betaine amphoteric copolymer containing a structural unit (D) represented by the following formula (37):

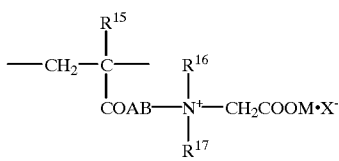

(37)

wherein A represents —O— or —NH—, B represents a $C_{2-6}$ alkylene group, $R^{15}$ represents a hydrogen atom or a methyl group, $R^{16}$ and $R^{17}$ each represents a $C_{1-4}$ alkyl group, X represents a chlorine, bromine or iodine atom, and M represents an alkali metal ion.

41. The thermoplastic resin film of claim 30, which is synthetic paper composed of a stretched polypropylene film containing a fine inorganic powder.

42. The thermoplastic resin film of claim 30, wherein a coating weight of said coated layer is 0.005 to 10 g/m² in terms of the solid content.

43. In a thermoplastic resin film comprising a surface subjected to flame treatment, the improvement wherein said flame treatment is at an energy of 34,600 to 138,400 joule/m² and provided thereon a coated layer comprising a water-soluble quaternary ammonium salt copolymer (I) containing a structural unit (a) represented by the following formula (38):

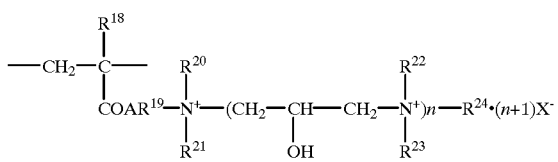

(38)

wherein A represents —O— or —NH—, $R^{13}$ represents a hydrogen atom or a methyl group, $R^{19}$ represents a $C_{2-4}$ alkylene group or —$CH_2$—CH(OH)—$CH_2$—, $R^{20}$, $R^{21}$, $R^{22}$ and $R^{23}$ are the same or different and each independently represents a $C_{1-3}$ alkyl group, $R^{24}$ represents a $C_{1-10}$ alkyl group or a $C_{7-10}$ aralkyl group, n stands for an integer of from 1 to 3, and X represents a chlorine, bromine or iodine atom, a structural unit (b) represented by the following formula (39):

(39)

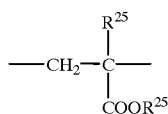

wherein $R^{25}$ represents a hydrogen atom or a methyl group, $R^{26}$ represents a $C_{1-22}$ alkyl group, $C_{7-22}$ aralkyl group or $C_{5-22}$ cycloalkyl group, and a structural unit (c) derived from a monomer copolymerizable with the components (a) and (b), the copolymerization ratio of said components (a), (b) and (c) falling within a range of 30 to 70:30 to 70:0to 40.

44. The thermoplastic resin film of claim 43, wherein said structural unit (b) is formed of the monomer combination selected from the group consisting of methyl methacrylate and ethyl methacrylate, and the group consisting of a $C_{4-22}$ alkyl methacrylate and cyclohexyl methacrylate.

45. The thermoplastic resin film of claim 43, wherein said water-soluble quaternary ammonium salt copolymer (I) has been obtained by modifying a dimethylaminoethyl methacrylate-ethyl methacrylate-cyclohexyl methacrylatestearyl methacrylate copolymer with 3-chloro-2-hydroxypropyltrimethylammonium chloride.

46. The thermoplastic resin film of claim 43, wherein said water-soluble quaternary ammonium salt copolymer (I) has been obtained by modifying a dimethylaminopropyl methacrylamide-ethyl methacrylate-butyl methacrylate copolymer with 3-chloro-2-hydroxypropyltrimethylammonium chloride.

47. The thermoplastic resin film of claim 43, wherein said coated layer comprises, based on 100 parts by weight of said water-soluble quaternary ammonium salt copolymer (I), (II) 10 to 600 parts by weight of a polyethyleneimine polymer selected from the group consisting of polyethyleneimine, poly(ethyleneimine-urea), polyaminepolyamide-polyethyleneimine adduct, $C_{1-8}$ alkyl polyethyleneimine and a mixture thereof.

48. The thermoplastic resin film of claim 47, wherein said coated layer further comprises, based on 100 parts by weight of the water-soluble quaternary ammonium salt copolymer (I), (III) 5 to 500 parts by weight of a polyaminepolyamide-epichlorohydrin adduct and (IV) 5 to 200 parts by weight of an alkali metal salt or alkaline earth metal salt.

49. The thermoplastic resin film of claim 43, which is synthetic paper composed of a stretched polypropylene film containing a fine inorganic powder.

50. The thermoplastic resin film of claim 43, wherein a coating weight of said coated layer is 0.005 to 10 g/m² in terms of the solid content.

51. In a thermoplastic resin film comprising a surface subjected to flame treatment, the improvement wherein said flame treatment is at an energy of 34,600 to 138,400 joule/m² and provided thereon a coated layer comprising a betaine arnphoteric copolymer (V) containing a structural unit (d) represented by the following formula (40):

(40)

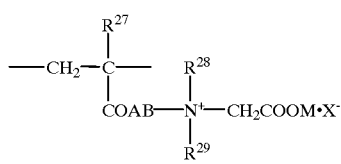

wherein A represents —O— or —NH—, B represents a $C_{2-6}$ alkylene group, $R^{27}$ represents a hydrogen atom or a methyl group, $R^{28}$ and $R^{29}$ each represents a $C_{1-4}$ alkyl group, X represents a chlorine, bromine or iodine atom, and M represents an alkali metal ion; a structural unit (41) represented by the following formula (e):

(41)

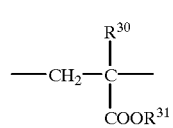

wherein $R^{30}$ represents a hydrogen atom or a methyl group, $R^{31}$ represents a $C_{1-22}$ alkyl group, $C_{7-22}$ aralkyl group or $C_{5-22}$ cycloalkyl group; a structural unit (42) represented by the following formula (f):

(42)

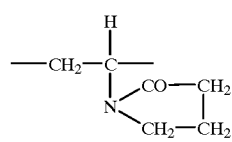

and a structural unit (g) derived from a monomer-copolymerizable with the component (d), (e) and (f), the copolymerizable weight ratio of said components (d), (e), (f) and (g) falling within a range of 25 to 45:30 to 70:0 to 25:0 to 25.

52. The thermoplastic resin film of claim 51, wherein said structural unit (e) is formed of the monomer combination selected from the group consisting of methyl methacrylate and ethyl methacrylate and the group consisting of a $C_{4-22}$ alkyl methacrylate and cyclohexyl methacrylate.

53. The thermoplastic resin film of claim 51, wherein said betaine amphoteric copolymer (V) has been obtained by modifying a dimethylaminoethyl methacrylate-ethyl methacrylate-cyclohexyl methacrylate-stearyl methacrylate-N-vinyl pyrrolidone copolymer with sodium monochloro-acetate.

54. The thermoplastic resin film of claim 51, wherein said coated layer comprises, based on 100 parts by weight of said betaine amphoteric copolymer (V), (II) 10 to 600 parts by weight of a polyethyleneimine polymer selected from the group consisting of polyethyleneimine, poly(ethyleneimine-urea), polyaminepolyamide-polyethyleneimine adduct, $C_{1-8}$ alkyl polyethyleneimine and a mixture thereof.

55. The thermoplastic resin film of claim 51, wherein said coated layer further comprises, based on 100 parts by weight of the betaine amphoteric copolymer (V), (III) 5 to 500 parts by weight of a polyaminepolyamide-epichlorohydrin adduct and (IV) 5 to 200 parts by weight of an alkali metal salt or alkaline earth metal salt.

56. The thermoplastic resin film of claim 51, which is synthetic paper composed of a stretched polypropylene film containing a fine inorganic powder.

57. The thermoplastic resin film of claim 51, wherein a coating weight of said coated layer is 0.005 to 10 g/mm in terms of the solid content.

* * * * *